US009864476B2

(12) United States Patent
Yang et al.

(10) Patent No.: US 9,864,476 B2
(45) Date of Patent: Jan. 9, 2018

(54) ELECTROMAGNETIC TOUCH THREE-DIMENSIONAL GRATING AND DISPLAY DEVICE THEREOF

(71) Applicants: BOE Technology Group Co., Ltd., Beijing (CN); Beijing BOE Optoelectronics Technology Co., Ltd., Beijing (CN)

(72) Inventors: Shengji Yang, Beijing (CN); Xue Dong, Beijing (CN); Haisheng Wang, Beijing (CN); Yingming Liu, Beijing (CN); Jingbo Xu, Beijing (CN); Jiantao Liu, Beijing (CN); Xiangyan Zhang, Beijing (CN)

(73) Assignees: BOE Technology Group Co., Ltd., Beijing (CN); Beijing BOE Optoelectronics Technology Co., Ltd., Beijing (CN)

( * ) Notice: Subject to any disclaimer, the term of this patent is extended or adjusted under 35 U.S.C. 154(b) by 150 days.

(21) Appl. No.: 14/799,730

(22) Filed: Jul. 15, 2015

(65) Prior Publication Data
US 2016/0291740 A1 Oct. 6, 2016

(30) Foreign Application Priority Data

Mar. 30, 2015 (CN) .......................... 2015 1 0145927

(51) Int. Cl.
*G06F 3/046* (2006.01)
*G09G 3/38* (2006.01)
(Continued)

(52) U.S. Cl.
CPC ............ *G06F 3/046* (2013.01); *G06F 3/0412* (2013.01); *G09G 3/003* (2013.01); *H04N 13/0409* (2013.01); *G09G 2354/00* (2013.01)

(58) Field of Classification Search
CPC ...... G06F 3/044; G06F 3/0446; G06F 3/0412; G06F 2203/04112; G09G 3/38;
(Continued)

(56) References Cited

U.S. PATENT DOCUMENTS

2013/0002614 A1* 1/2013 Nowatzyk ............. G06F 3/0488
345/179
2014/0063385 A1* 3/2014 Yang ....................... G06F 3/044
349/15

(Continued)

FOREIGN PATENT DOCUMENTS

CN 102231032 A * 11/2011
CN 102707515 A * 10/2012 ............. G02B 27/26
(Continued)

OTHER PUBLICATIONS

Apr. 5, 2017—(CN) First Office Action Appn 201510145927.9 with English Trans.

(Continued)

*Primary Examiner* — Amare Mengistu
*Assistant Examiner* — Jennifer Zubajlo
(74) *Attorney, Agent, or Firm* — Banner & Witcoff, Ltd.

(57) ABSTRACT

An electromagnetic touch three-dimensional grating comprising: an upper substrate and a lower substrate opposite to each other; a plurality of first strip electrodes located on a side of the lower substrate facing the upper substrate; and a plurality of second strip electrodes located on a side of the upper substrate facing the lower substrate and intersected with the first strip electrodes; wherein, during a touching period, the plurality of first strip electrodes are used as first electromagnetic touch electrodes, and the plurality of second strip electrodes are used as second electromagnetic touch electrodes; and during a three-dimensional displaying period, the plurality of first strip electrodes are used as first (Continued)

three-dimensional driving electrodes, and the second strip electrodes are used as a surface electrode, or, the plurality of second strip electrodes are used as second three-dimensional driving electrodes, and the first strip electrodes are used as a surface electrode.

11 Claims, 11 Drawing Sheets

(51) Int. Cl.
   *G06F 3/041* (2006.01)
   *G09G 3/00* (2006.01)
   *H04N 13/04* (2006.01)
(58) Field of Classification Search
   CPC ............... G09G 3/003; G09G 2354/00; H04N 13/0402; H04N 13/0409
   See application file for complete search history.

(56) References Cited

U.S. PATENT DOCUMENTS

| | | | | |
|---|---|---|---|---|
| 2014/0211104 A1* | 7/2014 | Yang | ....................... | G06F 3/041 349/12 |
| 2014/0285465 A1* | 9/2014 | Hayashi | .................. | G06F 3/044 345/174 |
| 2014/0375570 A1* | 12/2014 | Cok | ....................... | G06F 3/0416 345/173 |
| 2016/0109988 A1* | 4/2016 | Wang | ....................... | G06F 3/046 345/173 |
| 2016/0253013 A1* | 9/2016 | Yang | ....................... | G06F 3/041 345/173 |

FOREIGN PATENT DOCUMENTS

| | | |
|---|---|---|
| CN | 104123038 A | 10/2014 |
| CN | 104182112 A | 12/2014 |
| CN | 104375732 A | 2/2015 |

OTHER PUBLICATIONS

Jul. 24, 2017—CN Second Office Action Appn 201510145927.9 with English Tran.

* cited by examiner

US 9,864,476 B2

ELECTROMAGNETIC TOUCH THREE-DIMENSIONAL GRATING AND DISPLAY DEVICE THEREOF

This application claims priority to Chinese Patent Application No. 201510145927.9 filed on Mar. 30, 2015. The present application claims priority to and the benefit of the above-identified application and is incorporated herein in its entirety.

TECHNICAL FIELD

Embodiments of the present invention relate to an electromagnetic touch three-dimensional grating and a display device thereof.

BACKGROUND

At present, with the continuous development of LCD technology, a three-dimensional display technology has drawn considerable attention. The basic principle of the three-dimensional display technology is to receive different pictures by means of left and right human eyes, overlap and regenerate the image information through a human brain, and form an image having three-dimensional effect so that the pictures become three-dimensional and lifelike.

SUMMARY

Embodiments of the present invention provide an electromagnetic touch three-dimensional grating and a display device thereof, so as to simplify the structure relatively, and perform electromagnetic touch function as well as three-dimensional display function simultaneously.

At least one embodiment of the present invention provides an electromagnetic touch three-dimensional grating, comprising: an upper substrate and a lower substrate opposite to each other; a plurality of first strip electrodes located on a side of the lower substrate facing the upper substrate; and a plurality of second strip electrodes located on a side of the upper substrate facing the lower substrate and intersecting with the first strip electrodes.

During a touching period, the plurality of first strip electrodes are used as first electromagnetic touch electrodes, and the plurality of second strip electrodes are used as second electromagnetic touch electrodes.

During a three-dimensional displaying period, the plurality of first strip electrodes are used as first three-dimensional driving electrodes, and the second strip electrodes are used as a surface electrode; or, the plurality of second strip electrodes are used as second three-dimensional driving electrodes, and the first strip electrodes are used as a surface electrode.

In one embodiment of the present invention, the first electromagnetic touch electrodes and the first three-dimensional driving electrodes are arranged alternately; the second electromagnetic touch electrodes and the second three-dimensional driving electrodes are arranged alternately.

In one embodiment of the present invention, each two adjacent first electromagnetic touch electrodes in the first electromagnetic touch electrodes are regarded as a group; wherein in each group, one terminal of a first one of the two adjacent first electromagnetic touch electrodes and one terminal of a second one of the two adjacent first electromagnetic touch electrodes are interconnected via a first lead wire, the other terminal of the first one of the two adjacent first electromagnetic touch electrodes is an electromagnetic signal detection terminal; and the other terminals of the respective second ones in respective groups are interconnected via a second lead wire;

each two adjacent second electromagnetic touch electrodes in the second electromagnetic touch electrodes are regarded as a group; wherein in each group, one terminal of a first one of the two adjacent second electromagnetic touch electrodes and one terminal of a second one of the two adjacent second electromagnetic touch electrodes are interconnected via a third lead wire, the other terminal of the first one of the two adjacent second electromagnetic touch electrodes is an electromagnetic signal detection terminal; and the other terminals of the respective second ones in respective groups are interconnected via a fourth lead wire.

In one embodiment of the present invention, the first three-dimensional driving electrodes are interconnected at least at respective one terminal thereof via a fifth lead wire; the second three-dimensional driving electrode are interconnected at least at respective one terminal thereof via a sixth lead wire.

In one embodiment of the present invention, all the first strip electrodes are used as the first electromagnetic touch electrodes, and the first strip electrodes arranged alternately are used as the first three-dimensional driving electrodes; all the second strip electrodes are used as the second electromagnetic touch electrodes, and the second strip electrodes arranged alternately are used as the second three-dimensional driving electrodes.

In one embodiment of the present invention, in the first electromagnetic touch electrodes of the first strip electrodes, except those used as the first three-dimensional driving electrodes, each two adjacent first electromagnetic touch electrodes are regarded as a group; wherein in each group, one terminal of a first one of the two adjacent first electromagnetic touch electrodes and one terminal of a second one of the two adjacent first electromagnetic touch electrodes are interconnected via a first lead wire, the other terminal of the first one of the two adjacent first electromagnetic touch electrodes is an electromagnetic signal detection terminal; and the other terminals of the respective second ones in respective groups are interconnecting via a second lead wire;

in the second electromagnetic touch electrodes of the second strip electrodes, except those used as the second three-dimensional driving electrodes, each two adjacent second electromagnetic touch electrodes are regarded as a group; wherein in each group, one terminal of a first one of the two adjacent second electromagnetic touch electrodes and one terminal of a second one of the two adjacent second electromagnetic touch electrodes are interconnected via a third lead wire, the other terminal of the first one of the two adjacent second electromagnetic touch electrodes is an electromagnetic signal detection terminal; and the other terminals of the respective second ones in respective groups are interconnected via a fourth lead wire;

in the first three-dimensional driving electrodes, each two adjacent first three-dimensional driving electrodes are regarded as a group; wherein in each group, one terminal of a first one of the two adjacent first three-dimensional driving electrodes and one terminal of a second one of the two adjacent first three-dimensional driving electrodes are interconnected via a first lead wire, the other terminal of the first one of the two adjacent first three-dimensional driving electrodes is an electromagnetic signal detection terminal; and the other terminals of the respective second ones in respective groups are interconnected via a second lead wire;

in the second three-dimensional driving electrodes, each two adjacent second three-dimensional driving electrodes are regarded as a group; wherein in each group, one terminal of a first one of the two adjacent second three-dimensional driving electrodes and one terminal of a second one of the two adjacent second three-dimensional driving electrodes are interconnected via a third lead wire, the other terminal of the first one of the two adjacent second three-dimensional driving electrodes is an electromagnetic signal detection terminal; and the other terminals of the respective second ones in respective groups are interconnected via a fourth lead wire.

In one embodiment of the present invention, the electromagnetic touch three-dimensional grating further comprises: a liquid crystal layer or an electrochromic material layer located between the upper substrate and the lower substrate; wherein during a three-dimensional displaying period, the first three-dimensional driving electrodes are applied with a same three-dimensional displaying signal, and the second strip electrodes are grounded, such that a region in the liquid crystal layer or in the electrochromic material layer corresponding to the first three-dimensional driving electrodes is formed as a light blocking region; or, the second three-dimensional driving electrodes are applied with a same three-dimensional displaying signal, and the first strip electrodes are grounded, such that a region in the liquid crystal layer or in the electrochromic material layer corresponding to the second three-dimensional driving electrodes is formed as a light blocking region.

In one embodiment of the present invention, during a three-dimensional displaying period, the first strip electrodes except the first three-dimensional driving electrodes are grounded; or the second strip electrodes except the second three-dimensional driving electrodes are grounded.

Another embodiment of the present invention further provides a display device, comprising: a display panel; and the electromagnetic touch three-dimensional grating in accordance with any one of the above embodiments; wherein the electromagnetic touch three-dimensional grating is arranged on a light exiting side of the display panel.

In one embodiment of the present invention, the display panel is a liquid crystal display panel, an organic electroluminescent display panel, a plasma display panel or a cathode-ray tube monitor.

BRIEF DESCRIPTION OF THE DRAWINGS

In order to clearly illustrate the technical solution of the embodiments of the present invention, the drawings of the embodiments will be briefly described in the following; it is obvious that the described drawings are only related to some embodiments of the present invention and thus are not limitative of the present invention.

DETAILED DESCRIPTION

In order to make objects, technical solutions and advantages of the embodiments of the present invention apparent, the technical solutions of the embodiment will be described in a clearly and fully understandable way in connection with the drawings related to the embodiments of the present invention. It is obvious that the described embodiments are just a part but not all of the embodiments of the present invention. Based on the described embodiments herein, those skilled in the art can obtain other embodiment(s), without any inventive work, which should be within the scope of the present invention.

Figure 1:
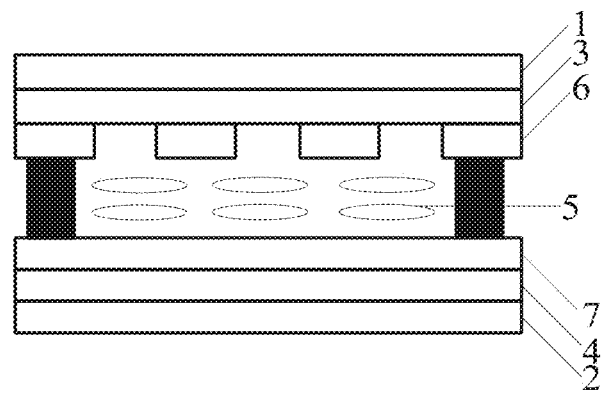
FIG. 1 is a structural schematic diagram of a liquid crystal grating.

In order to realize three-dimensional displaying, it is generally required to add a layer of three-dimensional grating on a display screen. According to the implementation mode, the three-dimensional gratings are divided into cylinder lens gratings and slit gratings (barrier gratings), which both can be realized by means of a liquid crystal grating. For example, a liquid crystal grating as illustrated in FIG. 1 generally consists of an upper polarizer 1, a lower polarizer 2, an upper substrate 3, a lower substrate 4, and a liquid crystal layer 5 between the two substrates; the lower substrate 4 is provided with a plate electrode 7, and the upper substrate 3 is provided with a strip electrodes 6. When used as the barrier grating, the liquid crystal grating illustrated in FIG. 1 is operated according to the following principle.

Upon an electrical field is generated from a potential difference between the strip electrodes 6 and the plate electrode 7, liquid crystals corresponding to the strip electrodes 6 rotate but the other liquid crystals maintain their original shape without rotating. At this moment, light rays enter from the lower polarizer 2, wherein, polarized light with a vibration direction parallel to a light transmittance axis of the lower polarizer 2 enters the liquid crystal layer 5 in which the polarized light passing through liquid crystals that are rotating gradually changes its vibration direction and thus cannot pass through the upper polarizer 1 as the vibration direction of this polarized light reaching the upper polarizer 1 is not consistent with the light transmittance axis of the upper polarizer 1, resulting in dark stripes formed in regions corresponding to the strip electrodes 6; while the polarized light passing through the liquid crystals that are not rotating does not change its vibration direction and hence can pass through the upper polarizer 1 as the vibration direction of this polarized light reaching the upper polarizer 1 is consistent with the light transmittance axis of the upper polarizer 1, resulting in bright stripes formed in regions corresponding to the non-strip electrodes. In this way, a slit grating along an extension direction of a length of the strip electrodes is formed, and a three-dimensional display mode of grating is realized. In the three-dimensional display mode, the slit grating controls the light emitted from pixels corresponding to images of left eye to be incident into the left eye only, and controls the light emitted from pixels corresponding to images of right eye to be incident into the right eye only, so as to realize a three-dimensional displaying effect by separating visible images of the right and left eyes.

With the rapid development of display technology, Touch Screen Panel has been gradually popularized in people's lives. At present, according to the working principle, the touch screen panels can be divided into resistive type, capacitive type, infrared type, SAW (Surface Acoustic Wave) type, electromagnetic type, DST (Dispersive Signal Technology) type and FTIR (Frustrated Total Internal Reflection) type. The capacitive touch screen panel has advantages of high sensitivity, long service life, and high transmittance and so on for its unique touch principle. However, the electromagnetic touch pad is widely used in many high-end computer aided design systems such as AutoCAD for it's capable of achieving original handwriting.

Figure 2:
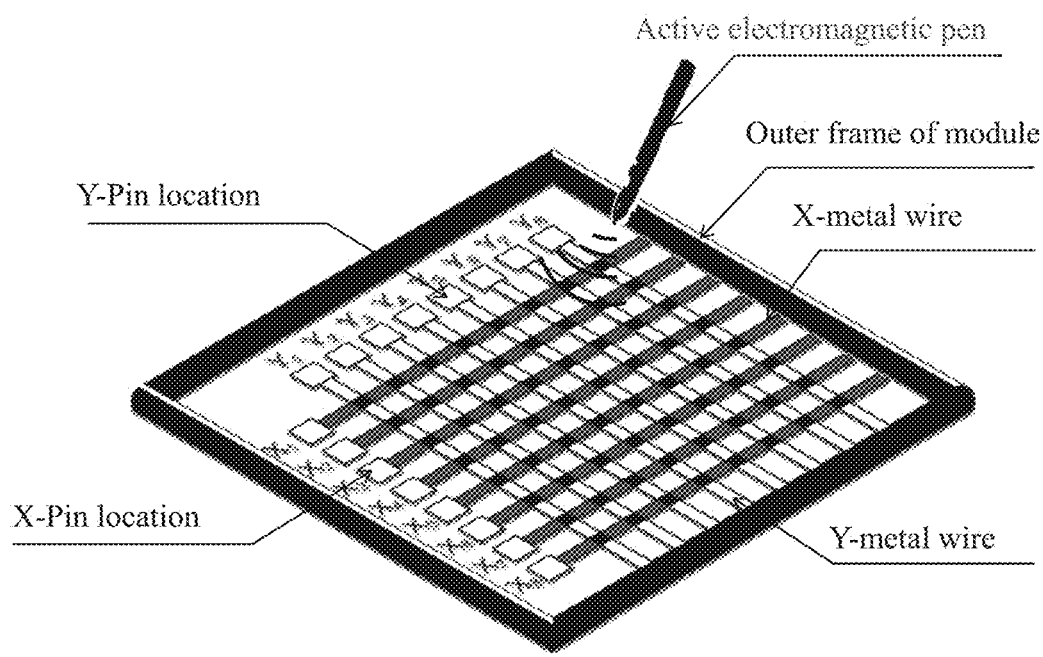
FIG. 2 is a structural schematic diagram of an electromagnetic touch antenna panel.
Figure 3:
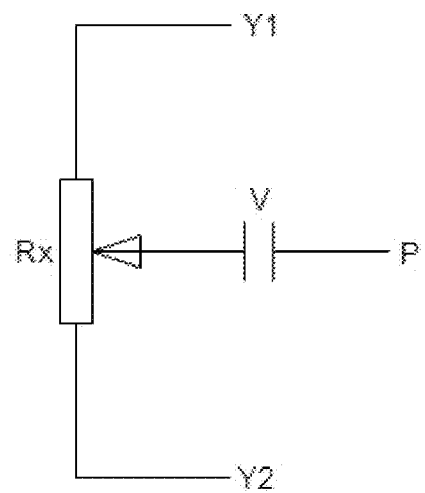
FIG. 3 is a principle diagram of electromagnetic touch.

At present, electromagnetic touch pads generally employ a touch-type antenna attached to a rear plate, and such electromagnetic touch-type antenna plate consists of metal wires crossed in vertical and horizontal directions. As illustrated in FIG. 2, the metal wires in X direction and the metal wires in Y direction, perpendicular to each other, are insulated from one another by an insulation layer. As illustrated in the principle diagram of electromagnetic touch of FIG. 3, two metal wires, i.e. a touch electrode Y1 and a touch electrode Y2, are interconnected by a touch electrode in the X direction, which is equivalent to that the touch electrode Y1 and the touch electrode Y2 are interconnected by a resistance Rx. Upon an electromagnetic pen is approaching a surface of module and sliding, an electromagnetic wave cuts the wires and an induced electromotive force V is generated, and the position closer to the electromagnetic pen has the stronger induced electromotive force. The magnitude of potential vectors received by the touch electrode Y1 and the touch electrode Y2 is represented by a position of a resistance arrow on the resistance, thus the position of the electromagnetic pen in the Y direction can finally be determined by determining the induced electromotive forces of the touch electrodes in the Y direction. Similarly, a position of the electromagnetic pen in the X direction can be determined. Since the metal wires in the X direction and Y direction are overlapping in the vertical direction, the moving of the electromagnetic pen can be regarded as two slide resistances synchronously sliding in the same direction or in two opposite directions, thus a coordinate position of a nib of the electromagnetic pen on the electromagnetic touch antenna panel can be calculated. At the same time, a front end of the electromagnetic pen is provided with a press-sensitive device, and a thickness of handwriting can be determined by a pressing intensity, which is the reason why the electromagnetic touch antenna panel can realize the original handwriting. Upon a master chip processes and computes voltage signals received by the touch antenna panel, a position of an electromagnetic handwriting pen and a pressing intensity of the pen can be obtained.

Since the metal wires of the electromagnetic touch antenna panel are non-transparent and since the entire electromagnetic touch antenna panel is relatively thicker, generally, it can only be attached to a rear side of the display panel. For a touch module has a structure in which the antenna panel is attached to the rear plate, a display panel is sandwiched between the electromagnetic pen and the antenna panel during touching operation, thus in order to achieve a smooth touching, it needs to increase the strength of electromagnetic signals of the electromagnetic pen, which leads to increased battery power consumption. Moreover, the electromagnetic signals with increased strength also have some influence on the display panel.

Figure 4:
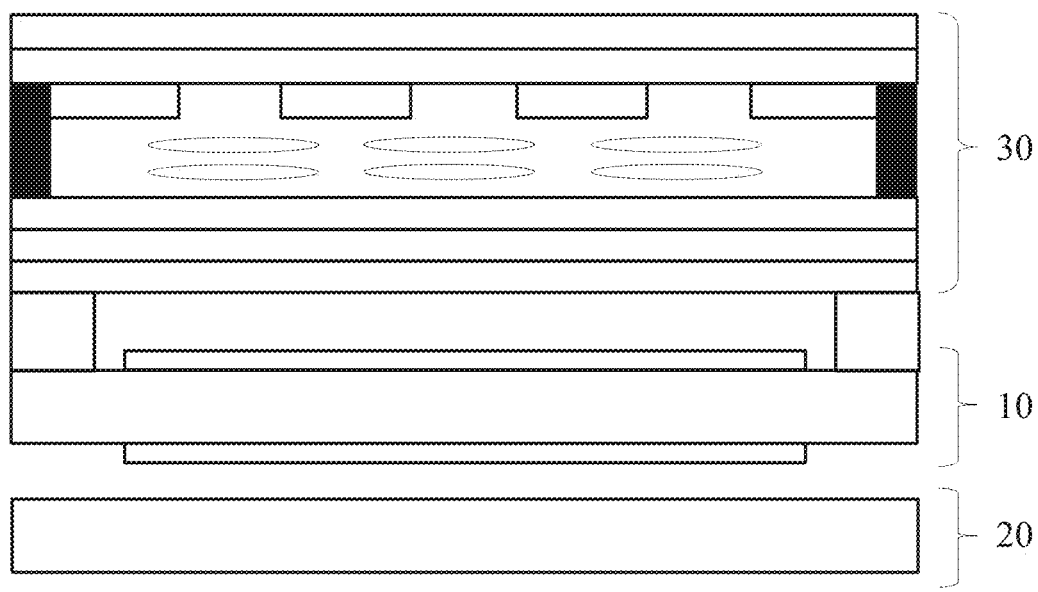
FIG. 4 is a structural schematic diagram of a display device comprising touch function and three-dimensional display function.

In addition, with the development of touch-screen technology, 3D display device that incorporates the touch screen and the three-dimensional displaying technology appears. In the application of electromagnetic touch panel used as a touch substrate, as illustrated in FIG. 4, it is generally required to add an electromagnetic touch panel 20 at the bottom of a display panel 10 and paste a three-dimensional grating 30 at the top of the display panel 10, which increases the overall thickness of the display device and also increases the complexity of the production process, resulting in increased production cost.

The film thickness and film shape of respective layers illustrated in the drawings are not intended to reflect the real scale of the electromagnetic touch three-dimensional grating but only to schematically explain the disclosure of the present invention by way of examples.

Figure 5:
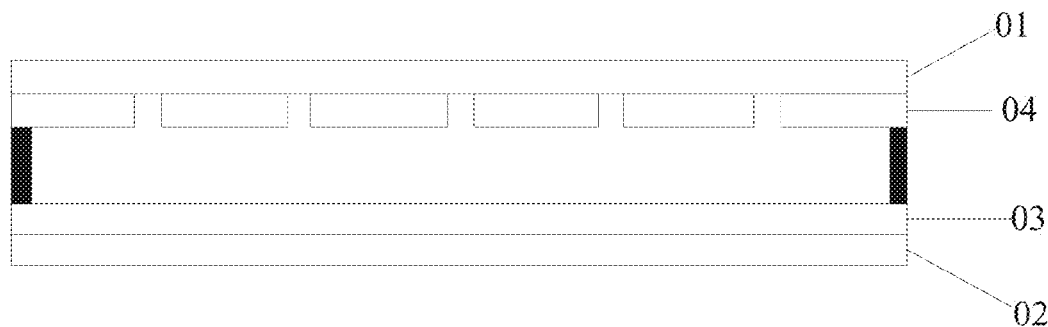
FIG. 5 is a structural schematic diagram of an electromagnetic touch three-dimensional grating of an embodiment of the present invention.

As illustrated in FIG. 5, at least one embodiment of the present invention provides an electromagnetic touch three-dimensional grating, comprising: an upper substrate 01 and a lower substrate 02 opposite to each other; a plurality of first strip electrodes 03 located on a side of the lower substrate 02 facing the upper substrate 01; and a plurality of second strip electrodes 04 located on a side of the upper substrate 01 facing the lower substrate 02 and intersected with the first strip electrodes 03.

Figure 6A:
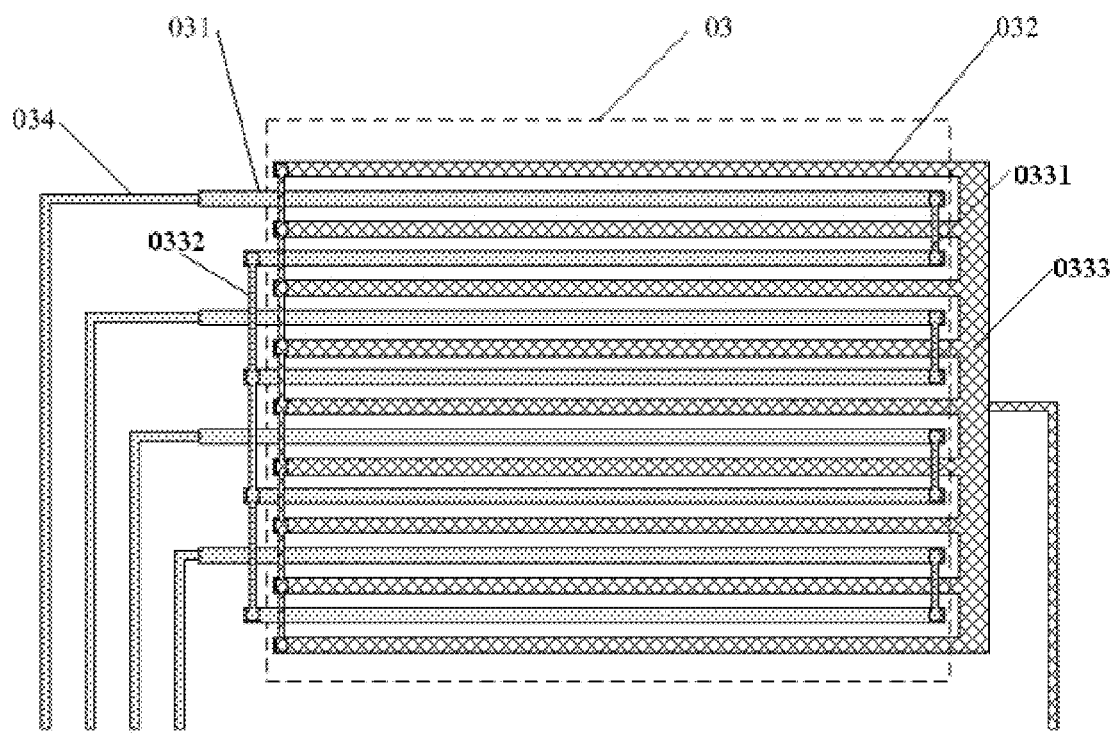
FIG. 6a is a schematic diagram of first strip electrodes on a lower substrate of a first embodiment of the present invention.
Figure 6B:
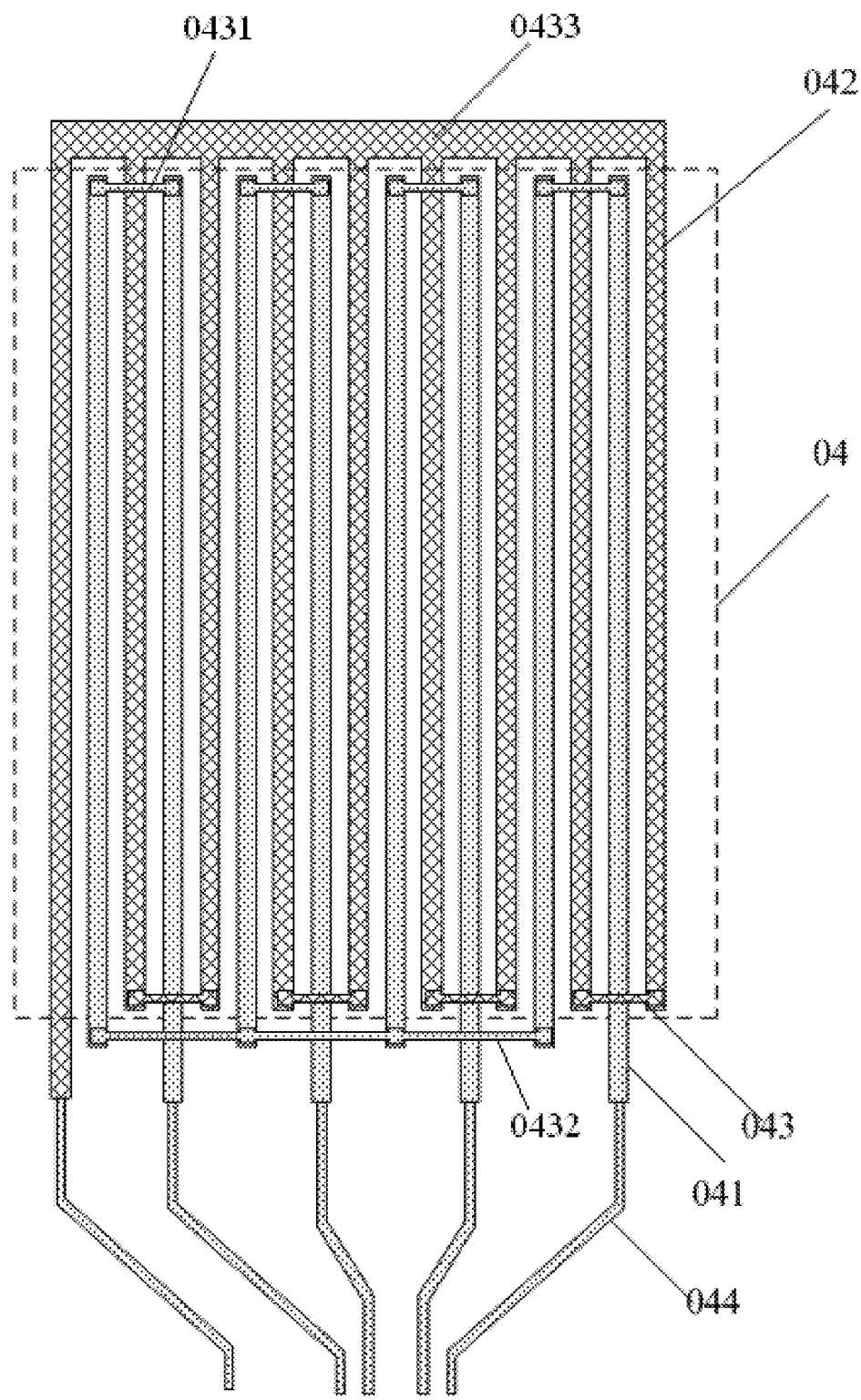
FIG. 6b is a schematic diagram of second strip electrodes on a upper substrate of the first embodiment of the present invention.

As illustrated in FIGS. 6a and 6b, during a touching period, the plurality of first strip electrodes 03 are used as first electromagnetic touch electrodes 031, and the plurality of second strip electrodes 04 are used as second electromagnetic touch electrodes 041.

As illustrated in FIGS. 6a and 6b, during a three-dimensional displaying period, the plurality of first strip electrodes 03 are used as first three-dimensional driving electrodes 032, and the second strip electrodes 04 are used as a surface electrode; or, the plurality of second strip electrodes 04 are used as second three-dimensional driving electrodes 042, and the first strip electrodes 03 are used as a surface electrode.

In the electromagnetic touch three-dimensional grating provided in the embodiment of the present invention, the plate electrode disposed on the lower substrate 02 in the three-dimensional grating is replaced by the strip electrodes, such that the opposed surfaces of the upper substrate 01 and the lower substrate 02 are provided with the second strip electrodes 04 and the first strip electrodes 03, respectively, which are intersected with each. During the touching period, the plurality of first strip electrodes 03 are used as the first electromagnetic touch electrodes 031, and the plurality of second strip electrodes 04 are used as the second electromagnetic touch electrodes 041, so as to realize an electromagnetic touch function. During the three-dimensional displaying period, the plurality of first strip electrodes 03 are used as the first three-dimensional driving electrodes 032, and the plurality of second strip electrodes 04 are used as the surface electrode; or, the plurality of second strip electrodes 04 are used as the second three-dimensional driving electrodes 042, and the plurality of first strip electrodes 03 are used as the surface electrode. The first three-dimensional driving electrodes 032 or the second three-dimensional driving electrodes 042 respectively can form a three grating structure together with the surface electrode, that is to say, the three grating structure can be formed in a direction perpendicular to an extension direction of the first three-dimensional driving electrodes 032 or in a direction perpendicular to an extension direction of the second three-dimensional driving electrodes 042, so as to realize a three-dimensional display mode in two directions. Compared with a structure which is required to add a layer of electromagnetic touch panel at the bottom of a three-dimensional display screen, the electromagnetic touch three-dimensional grating according to the embodiment of the present invention only has to change the electrode structure of the lower substrate, and can realize an electromagnetic touch function and a three-dimensional display function in a time-sharing manner by loading signals to the respective electrodes, which simplifies the module structure and the production process, reduces the overall production costs of the module while reducing the thickness of the display screen. In addition, the electromagnetic touch electrodes are disposed in front, which can also reduce the strength of electromagnetic signal of the electromagnetic pen, thereby reducing the power consumption and also the influence of electromagnetic signals on the display panel.

For example, in the electromagnetic touch three-dimensional grating provided in the embodiment of the present invention, the second strip electrodes 04 arranged on the upper substrate 01 and the first strip electrodes 03 arranged on the lower substrate 02 are perpendicular to each other in different planes. Hereafter the electromagnetic touch three-dimensional grating provided by the embodiment of the present invention is described with the first strip electrodes 03 and the second strip electrodes 04 being perpendicular to each other in different planes by way of example, wherein the first strip electrodes 03 as illustrated in FIG. 6a are lateral electrodes, and correspondingly, the second strip electrodes 04 as illustrated in FIG. 6a are longitudinal electrodes.

For example, in the above electromagnetic touch three-dimensional grating provided in the embodiment of the present invention, the first electromagnetic touch electrodes 031 are selected from the first strip electrodes 03 and the second electromagnetic touch electrodes 041 are selected from the second strip electrodes 04 during the touching period by a variety of selection methods, and the first three-dimensional driving electrodes 032 are selected from the first strip electrodes 03 or the second three-dimensional driving electrodes 042 are selected from the second strip electrodes 04 by a variety of selection methods. The selection methods of respective electrodes are explained below by way of example in connection with a first embodiment and a second embodiment.

First Embodiment

For example, in the electromagnetic touch three-dimensional grating provided in one embodiment of the present invention, as illustrated in FIG. 6a, the first electromagnetic touch electrodes 031 and the first three-dimensional driving electrodes 032 are arranged alternately. At the same time, as illustrated in FIG. 6b, the second electromagnetic touch electrodes 041 and the second three-dimensional driving electrodes 042 are arranged alternately.

For example, in order to make the electromotive force generated between the first electromagnetic touch electrodes 031 and the second electromagnetic touch electrodes 041 be more easily influenced by a touch pen, the connection relation between the first electromagnetic touch electrodes 031 is set as illustrated in FIG. 6a, and the connection relation between the second electromagnetic touch electrodes 041 is set as illustrated in FIG. 6b.

Figure 7A:
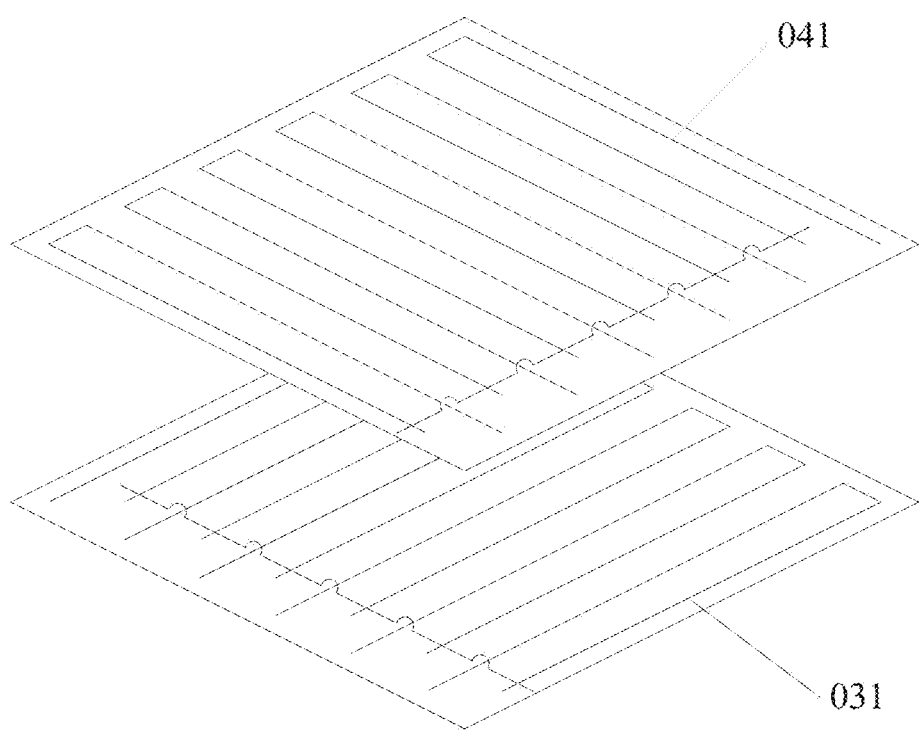
FIGS. 7a and 7b are schematic diagrams of the first embodiment of the present invention during a touching period, respectively.

As illustrated in FIG. 6a, in the first electromagnetic touch electrodes 031, each two adjacent first electromagnetic touch electrodes 031 are regarded as a group; wherein in each group, one terminal of a first one of the two adjacent first electromagnetic touch electrodes and one terminal of a second one of the two adjacent first electromagnetic touch electrodes are interconnected via a first lead wire 0331, the other terminal of the first one of the two adjacent first electromagnetic touch electrodes is an electromagnetic signal detection terminal connecting to a first metal routing 034 so as to be loaded with different signals at different times; and the other terminals of the respective second ones in respective groups are interconnected via a second lead wire 0332. As illustrated in FIG. 7a, a loop is formed between the first electromagnetic touch electrodes 031 by the first and second lead wires 0331 and 0332, such that electromagnetic touch signals can be transmitted between the first electromagnetic touch electrodes 031.

As illustrated in FIG. 6b, in the second electromagnetic touch electrodes 041, each two adjacent second electromagnetic touch electrodes 041 are regarded as a group; wherein in each group, one terminal of a first one of the two adjacent second electromagnetic touch electrodes and one terminal of a second one of the two adjacent second electromagnetic touch electrodes are interconnected via a third lead wire 0431, the other terminal of the first one of the two adjacent second electromagnetic touch electrodes is an electromagnetic signal detection terminal connecting to a second metal routing 044 so as to be loaded with different signals at different times; and the other terminals of the respective second ones in respective groups are interconnected via a fourth lead wire 0432. As illustrated in FIG. 7a, a loop is formed between the respective second electromagnetic touch electrodes 041 by the third and fourth lead wires 0431 and 0432, such that electromagnetic touch signals can be transmitted between the second electromagnetic touch electrodes 041.

Figure 7B:
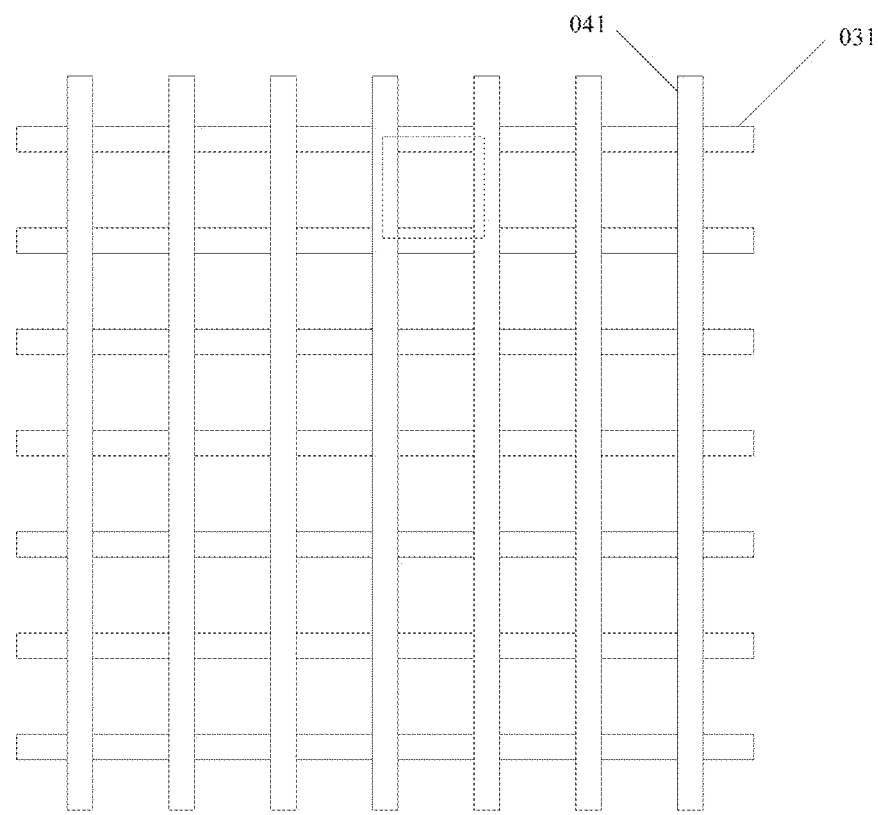

As seen from the principle diagram of electromagnetic touch of FIG. 7b, a plurality of first electromagnetic touch electrodes 031 and a plurality of second electromagnetic touch electrodes 041, which are arranged to be intersected with each other, constitute a plurality of electromagnetic touch induction units (illustrated as a dashed box in the figure). Upon an electromagnetic pen is sliding on the electromagnetic touch induction units, the electromagnetic touch induction units generate an induced electromotive force, and the position closer to the electromagnetic pen has the stronger induced electromotive force. The position of the occurrence of touch can be ultimately determined by detecting and comparing signals of first electromagnetic touch electrodes 031 and second electromagnetic touch electrodes 041.

For example, in order to facilitate signal loading of the first three-dimensionally driving electrodes 032 and the second three-dimensionally driving electrodes 042, as illustrated in FIG. 6a, the first three-dimensional driving electrodes 032 can be interconnected at least at respective one terminal thereof via a fifth lead wire 0333; as illustrated in FIG. 6b, the second three-dimensional driving electrode 042 can be interconnected at least at respective one terminal thereof via a sixth lead wire 0433.

Second Embodiment

Figure 8A:
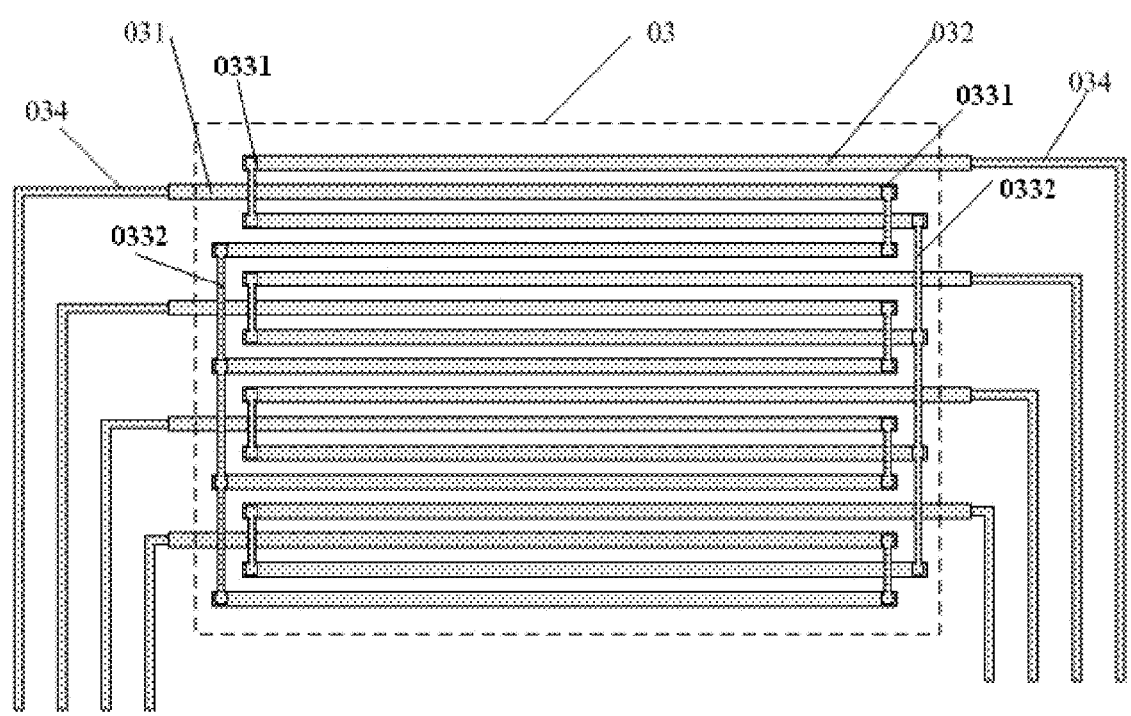
FIG. 8a is a schematic diagram of first strip electrodes on a lower substrate of a second embodiment of the present invention.
Figure 8B:
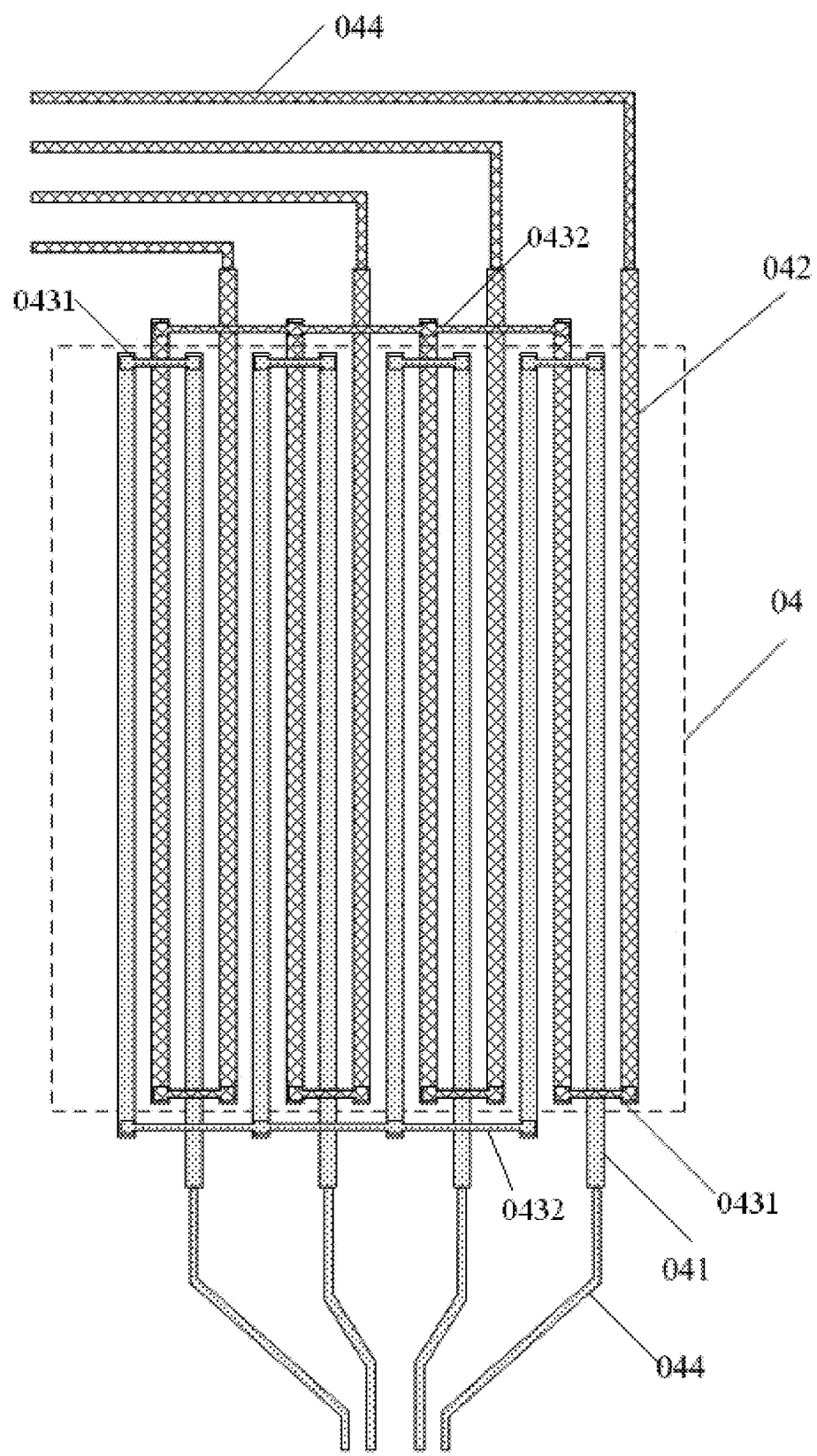
FIG. 8b is a schematic diagram of second strip electrodes on a upper substrate of the second embodiment of the present invention.

For example, in the electromagnetic touch three-dimensional grating provided in one embodiment of the present invention, during the touching period, as illustrated in FIG. 8*a*, all the first strip electrodes 03 can be used as the first electromagnetic touch electrodes 031; at the meanwhile, as illustrated in FIG. 8*b*, all the second strip electrodes 04 can be used as the second electromagnetic touch electrodes 041; during the three-dimensional displaying period, as illustrated in FIG. 8*a*, the first strip electrodes 03 arranged alternately can be used as the first three-dimensional driving electrodes 032; or, as illustrated in FIG. 8*b*, the second strip electrodes 04 arranged alternately can be used as the second three-dimensional driving electrodes 042.

As compared with the structure of the first embodiment, the structure of the second embodiment can double the electromagnetic touch resolution, as all the first strip electrodes 03 and all the second strip electrodes 04 are used as electromagnetic touch electrodes.

For example, in order to make the electromotive force generated between the first electromagnetic touch electrodes 031 and the second electromagnetic touch electrodes 041 be more easily influenced by a touch pen, the connection relation between the first electromagnetic touch electrodes 031 is set as illustrated in FIG. 8*a*, and the connection relation between the second electromagnetic touch electrodes 041 is set as illustrated in FIG. 8*b*.

As illustrated in FIG. 8*a*, in the first electromagnetic touch electrodes 031 of the first strip electrodes 03, except those used as the first three-dimensional driving electrodes 032, each two adjacent first electromagnetic touch electrodes 031 are regarded as a group; wherein in each group, one terminal of a first one of the two adjacent first electromagnetic touch electrodes and one terminal of a second one of the two adjacent first electromagnetic touch electrodes are interconnected via a first lead wire 0331, the other terminal of the first one of the two adjacent first electromagnetic touch electrodes is an electromagnetic signal detection terminal connecting to a first metal routing 034 so as to be loaded with different signals at different times via the first metal routing 034; and the other terminals of the respective second ones in respective groups are interconnected via a second lead wire 0332.

As illustrated in FIG. 8*a*, in the first three-dimensional driving electrodes 032, each two adjacent first three-dimensional driving electrodes 032 are regarded as a group; wherein in each group, one terminal of a first one of the two adjacent first three-dimensional driving electrodes 032 and one terminal of a second one of the two adjacent first three-dimensional driving electrodes 032 are interconnected via the first lead wire 0331, the other terminal of the first one of the two adjacent first three-dimensional driving electrodes 032 is an electromagnetic signal detection terminal connecting to the first metal routing 034 so as to be loaded with different signals at different times via the first metal routing 034; and the other terminals of the respective second ones in respective groups are interconnected via the second lead wire 0332.

As illustrated in FIG. 8*b*, in the second electromagnetic touch electrodes 041 of the second strip electrodes 04, except those used as the second three-dimensional driving electrodes 042, each two adjacent second electromagnetic touch electrodes 041 are regarded as a group; wherein in each group, one terminal of a first one of the two adjacent second electromagnetic touch electrodes and one terminal of a second one of the two adjacent second electromagnetic touch electrodes are interconnected via a third lead wire 0431, the other terminal of the first one of the two adjacent second electromagnetic touch electrodes is an electromagnetic signal detection terminal connecting to a second metal routing 044 so as to be loaded with different signals at different times via the second metal routing 044; and the other terminals of the respective second ones in respective groups are interconnected via a fourth lead wire 0432.

As illustrated in FIG. 8*b*, in the second three-dimensional driving electrodes 042, each two adjacent second three-dimensional driving electrodes 042 are regarded as a group; wherein in each group, one terminal of a first one of the two adjacent second three-dimensional driving electrodes 042 and one terminal of a second one of the two adjacent second three-dimensional driving electrodes 042 are interconnected via the third lead wire 0431, the other terminal of the first one of the two adjacent second three-dimensional driving electrodes is an electromagnetic signal detection terminal connecting to the second metal routing 044 so as to be loaded with different signals at different times via the second metal routing 034; and the other terminals of the respective second ones in respective groups are interconnected via the fourth lead wire 0432.

For example, in a three-dimensional display mode, the electromagnetic touch three-dimensional grating provided in one embodiment of the present invention can be implemented as a slit grating (barrier grating). For example, the electromagnetic touch three-dimensional grating can be implemented as a slit grating by disposing a liquid crystal layer or an electrochromic material layer between the upper substrate 01 and the lower substrate 02. For example, during the three-dimensional displaying period, the first three-dimensional driving electrodes 032 are applied with the same three-dimensional displaying signal, and the second strip electrodes 04 are grounded, such that a region in the liquid crystal layer or in the electrochromic material layer corresponding to the first three-dimensional driving electrodes 032 is formed as a lateral, light blocking region illustrated in FIG. 9*a*; or, the second three-dimensional driving electrodes 042 are applied with the same three-dimensional displaying signal and the first strip electrodes 03 are grounded, such that a region in the liquid crystal layer or in the electrochromic material layer corresponding to the second three-dimensional driving electrodes 042 is formed as a longitudinal, light blocking region illustrated in FIG. 9*b*.

Figure 9A:
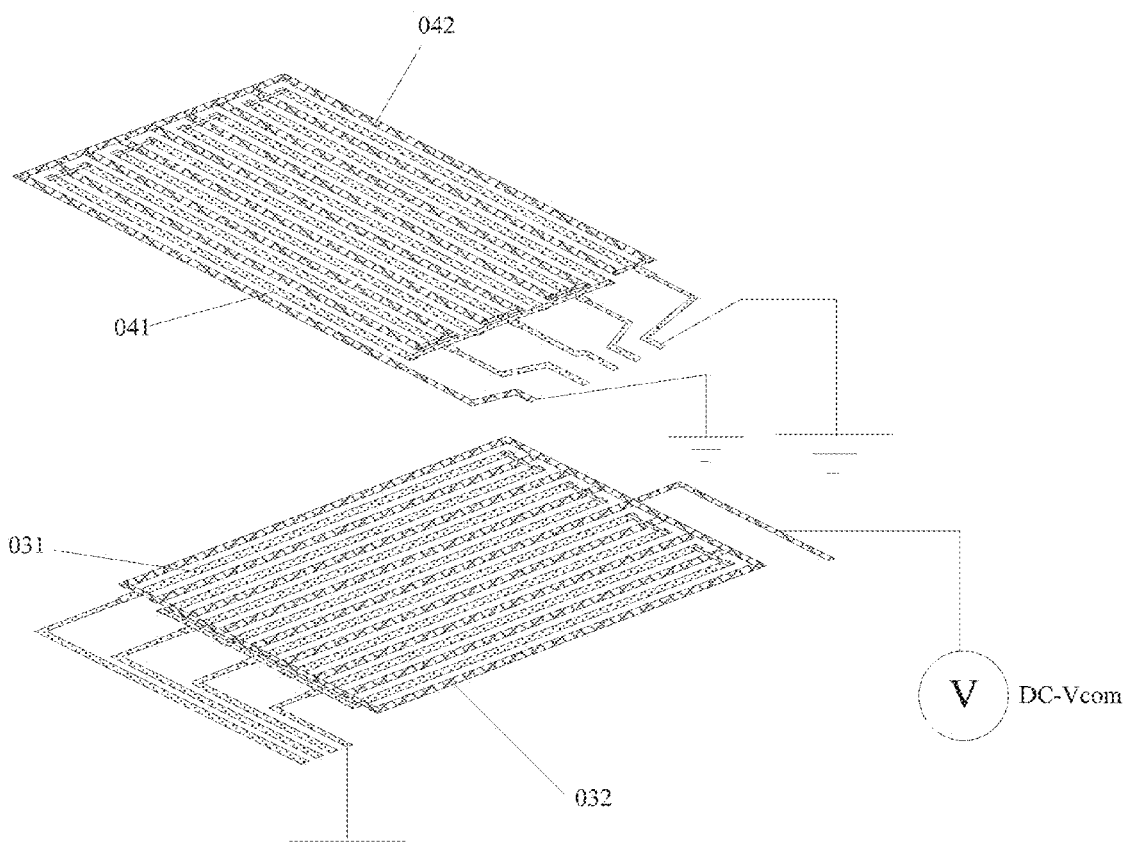
FIGS. 9a and 9b are schematic diagrams of the first embodiment of the present invention during a three-dimensional displaying period, respectively.
Figure 9B:
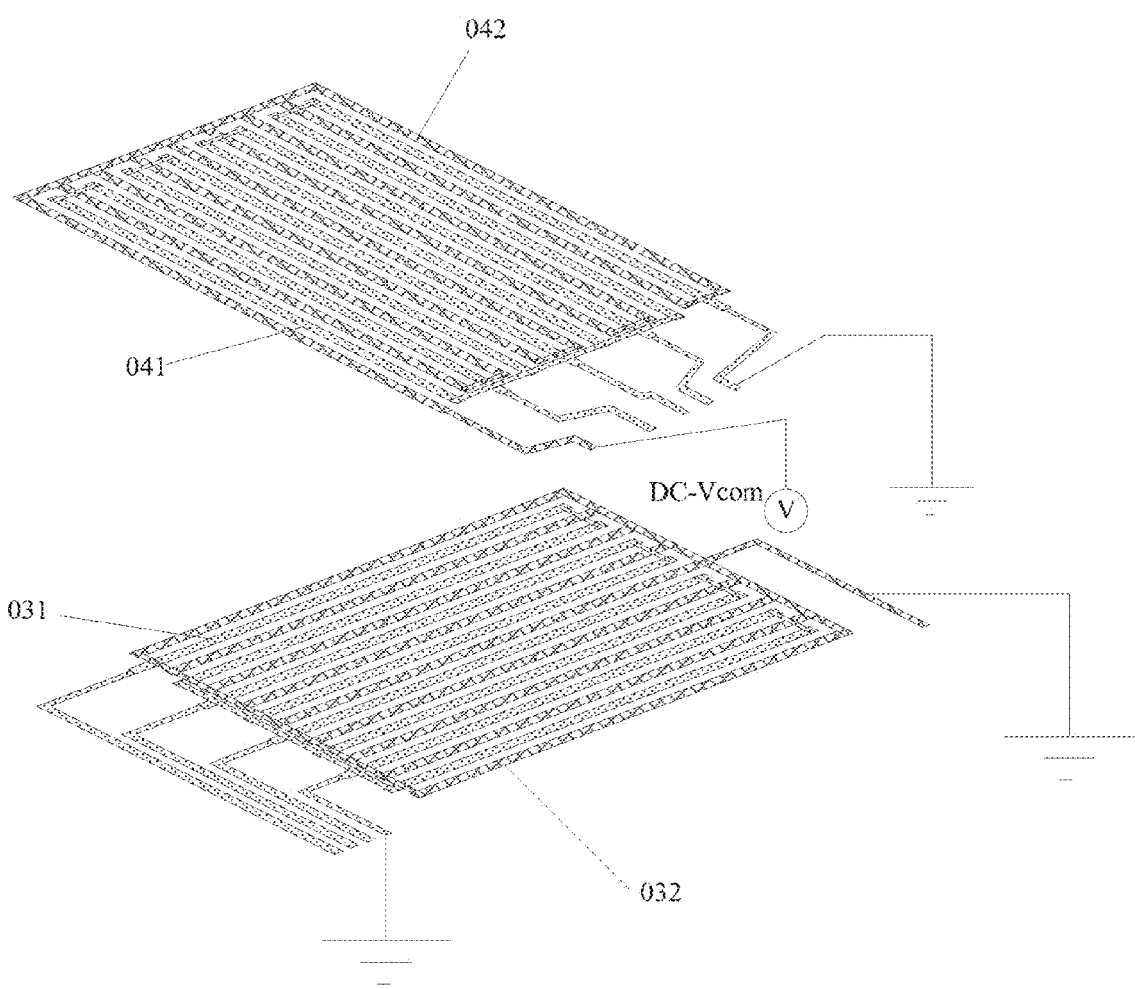

For example, when the electromagnetic touch three-dimensional grating provided in the embodiment of the present invention is implemented as a slit grating in the three-dimensional display mode, in order to realize transparent light stripes during the three-dimensional displaying period, the first strip electrodes 03 except the first three-dimensional driving electrodes 032, i.e. the first electromagnetic touch electrodes 031, are grounded, as illustrated in FIG. 9*a*; or, the second strip electrodes 04 except the second three-dimensional driving electrodes 042, i.e. the second electromagnetic touch electrodes 041, are grounded, as illustrated in FIG. 9*b*.

FIG. 9*a* and FIG. 9*b* are illustrated with the structure of the first embodiment by way of example, that is, the first electromagnetic touch electrodes 031 and the first three-dimensional driving electrodes 032 are arranged alternately, and the second electromagnetic touch electrodes 041 and the second three-dimensional driving electrodes 042 are arranged alternately. Similarly, the structure of the second embodiment can also be implemented as a slit grating in the three-dimensional display mode, which will not be repeated herein.

Figure 10:
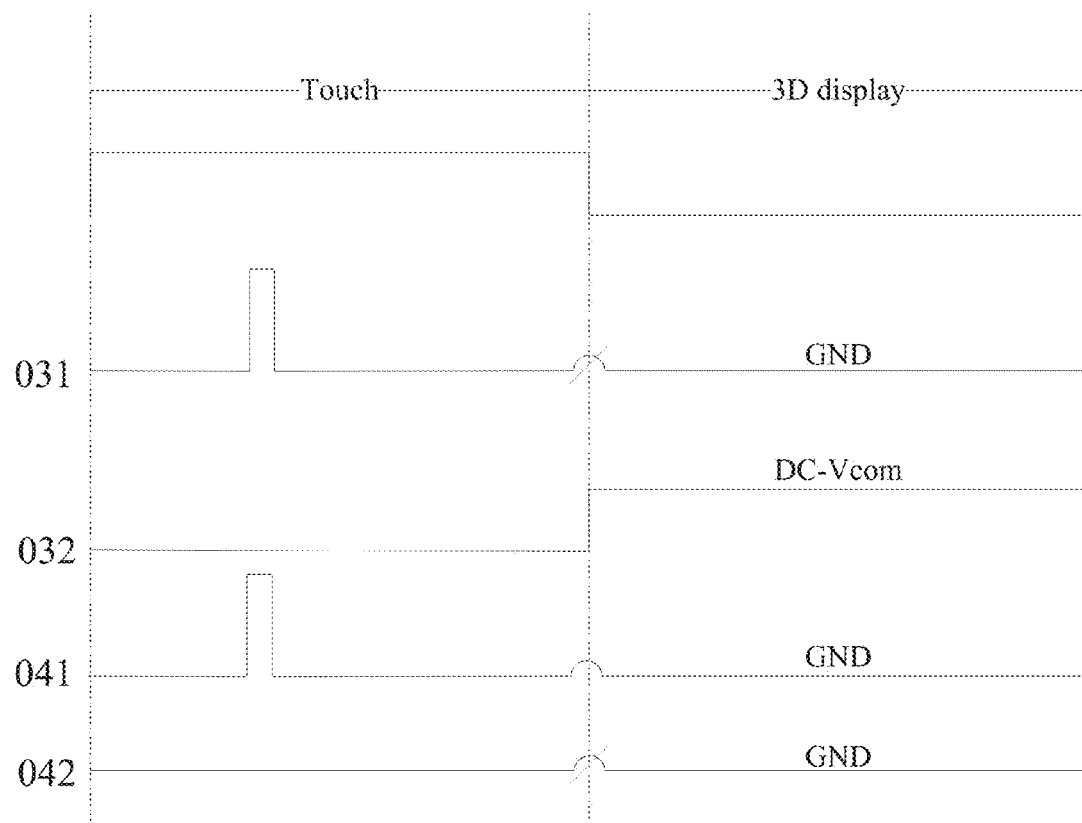
FIG. 10 is a time sequence chart of the electromagnetic touch three-dimensional grating of the embodiments of the present invention in operation.

FIG. 10 illustrates a time sequence chart of the three-dimensional grating with the structure of FIG. 9a in operation. The three-dimensional grating is driven in a time-sharing manner. During the touching period (Touch), the first electromagnetic touch electrodes 031 and the second electromagnetic touch electrodes 041 sense the induced electromotive force simultaneously, the first three-dimensional driving electrodes 032 and the second three-dimensional driving electrodes 042 are used as floating electrodes to which no signal is input. During the three-dimensional displaying period (3D display), the first electromagnetic touch electrodes 031 and the second electromagnetic touch electrodes 041 are grounded (GND), the first three-dimensional driving electrodes 032 are loaded with three-dimensional driving signal DC-Vcom, and the second three-dimensional diving electrodes 042 are grounded (GND).

Figure 11:
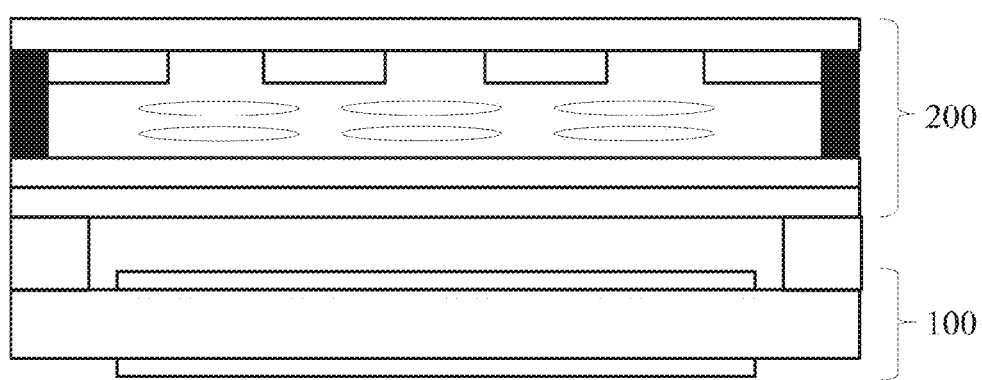
FIG. 11 is a structural schematic diagram of a display device of an embodiment of the present invention.

On the basis of the same inventive concept, another embodiment of the present invention further provides a display device. As illustrated in FIG. 11, the display device comprises: a display panel 100, and an electromagnetic touch three-dimensional grating 200 arranged on a light exiting side of the display panel 100. The electromagnetic touch three-dimensional grating 200 is the one in accordance with any of the above embodiments.

For example, the display device provided by the embodiment of the present invention can be a mobile phone, a tablet computer, a television, a display, a notebook computer, a digital photo frame, a navigator, or any other products or components having display function. For the implementation of the display device, reference can be made to the above embodiments of the electromagnetic touch three-dimensional grating, which will not be repeated herein.

For example, the display panel in the display device provided by the embodiment of the present invention can be a liquid crystal display (LCD) panel, an organic electroluminescence display (OLED) panel, a plasma display (PDP) panel or a cathode-ray tube (CRT) monitor, without limiting herein.

In the electromagnetic touch three-dimensional grating and the display device provided in the embodiments of the present invention, the plate electrode disposed on the lower substrate in the three-dimensional grating is replaced by strip electrodes such that the opposed surfaces of the upper substrate and the lower substrate are respectively provided with the first strip electrodes and the second strip electrodes which are intersected with each other. During the touching period, the plurality of first strip electrodes are used as the first electromagnetic touch electrodes, and the plurality of second strip electrodes are used as the second electromagnetic touch electrodes, so as to realize an electromagnetic touch function. During the three-dimensional displaying period, the plurality of first strip electrodes are used as the first three-dimensional driving electrodes, and the plurality of second strip electrodes are used as the surface electrode; or, the plurality of second strip electrodes are used as the second three-dimensional driving electrodes, and the plurality of first strip electrodes are used as the surface electrode. The first three-dimensional driving electrodes or the second three-dimensional driving electrodes both can form a three grating structure together with the surface electrode, that is to say, the three grating structure can be formed in a direction perpendicular to an extension direction of the first three-dimensional driving electrodes or in a direction perpendicular to an extension direction of the second three-dimensional driving electrodes, so as to realize a three-dimensional display mode in two directions. Compared with the structure required to add a layer of electromagnetic touch panel at the bottom of a three-dimensional display screen, the electromagnetic touch three-dimensional grating according to the embodiment of the present invention only has to change the electrode structure of the lower substrate, and can realize electromagnetic touch function and three-dimensional display function in a time-sharing manner by loading signals to the electrodes, which simplifies the module structure and the production process, reduces the overall production costs of the module while reducing the thickness of the display screen. In addition, the electromagnetic touch electrodes are disposed in front, which can also reduce the strength of electromagnetic signal of the electromagnetic pen, thereby reducing the power consumption and also the influence of electromagnetic signals on the display panel.

The foregoing embodiments are merely used for explaining the technical solution of the present invention, and not intended to limit the present invention; although the present invention is explained in detail with reference to the foregoing embodiments, those of ordinary skill in the art will readily appreciate that many modifications are possible in the foregoing embodiments, or equivalent substitutions are made for part of technical features; however, these modifications or substitutions are not intended to make the essences of the corresponding technical solutions depart from the spirit and the scope of the technical solutions of the embodiments of the present invention.

The present application claims priority of Chinese Patent Application No. 201510145927.9 filed on Mar. 30, 2015, the disclosure of which is incorporated herein by reference in its entirety as part of the present application.

What is claimed is:

1. An electromagnetic touch three-dimensional grating, comprising: an upper substrate and a lower substrate opposite to each other; a plurality of first strip electrodes located on a side of the lower substrate facing the upper substrate; and a plurality of second strip electrodes located on a side of the upper substrate facing the lower substrate and intersected with the first strip electrodes; wherein, during a touching period, the plurality of first strip electrodes are used as first electromagnetic touch electrodes, and the plurality of second strip electrodes are used as second electromagnetic touch electrodes; and during a three-dimensional displaying period, the plurality of first strip electrodes are used as first three-dimensional driving electrodes, and the second strip electrodes are used as a surface electrode; or, the plurality of second strip electrodes are used as second three-dimensional driving electrodes, and the first strip electrodes are used as a surface electrode, wherein, the first electromagnetic touch electrodes and the first three-dimensional driving electrodes are arranged alternately; the second electromagnetic touch electrodes and the second three-dimensional driving electrodes are arranged alternately, in the first electromagnetic touch electrodes, each two adjacent first electromagnetic touch electrodes are regarded as a group; wherein in each group, one terminal of a first one of the two adjacent first electromagnetic touch electrodes and one terminal of a second one of the two adjacent first electromagnetic touch electrodes are interconnected via a first lead wire, the other terminal of the first one of the two adjacent first electromagnetic touch electrodes is an electromagnetic signal detection terminal; and the other terminals of the respective second ones in respective groups are interconnected via a second lead wire; and in the second electromagnetic touch electrodes, each two adjacent second electromagnetic touch electrodes are regarded as a group; wherein in each group, one terminal of a first one of the two adjacent second electromagnetic touch electrodes and one terminal of a second one of the two adjacent second electromagnetic touch electrodes are interconnected via a third lead wire, the other terminal of the first one of the two adjacent second electromagnetic touch electrodes is an electromagnetic signal detection terminal; and the other terminals of the respective second ones in respective groups are interconnected via a fourth lead wire.

2. The electromagnetic touch three-dimensional grating according to claim 1, wherein, the first three-dimensional driving electrodes are interconnected at least at respective one terminal thereof via a fifth lead wire; and the second three-dimensional driving electrodes are interconnected at least at respective one terminal thereof via a sixth lead wire.

3. The electromagnetic touch three-dimensional grating according to claim 2, further comprising a liquid crystal layer or an electrochromic material layer located between the upper substrate and the lower substrate; wherein during a three-dimensional displaying period, the first three-dimensional driving electrodes are applied with a same three-dimensional displaying signal, and the second strip electrodes are grounded, such that a region in the liquid crystal layer or in the electrochromic material layer corresponding to the first three-dimensional driving electrodes is formed as a light blocking region; or, the second three-dimensional driving electrodes are applied with a same three-dimensional displaying signal, and the first strip electrodes are grounded, such that a region in the liquid crystal layer or in the electrochromic material layer corresponding to the second three-dimensional driving electrodes is formed as a light blocking region.

4. The electromagnetic touch three-dimensional grating according to claim 1, wherein, all of the first strip electrodes are used as the first electromagnetic touch electrodes, and the first strip electrodes arranged alternately are used as the first three-dimensional driving electrodes; and all of the second strip electrodes are used as the second electromagnetic touch electrodes, and the second strip electrodes arranged alternately are used as the second three-dimensional driving electrodes.

5. The electromagnetic touch three-dimensional grating according to claim 4, wherein, in the first electromagnetic touch electrodes of the first strip electrodes, except those used as the first three-dimensional driving electrodes, each two adjacent first electromagnetic touch electrodes are regarded as a group; wherein in each group, one terminal of a first one of the two adjacent first electromagnetic touch electrodes and one terminal of a second one of the two adjacent first electromagnetic touch electrodes are interconnected via a first lead wire, the other terminal of the first one of the two adjacent first electromagnetic touch electrodes is an electromagnetic signal detection terminal; and the other terminals of the respective second ones in respective groups are interconnected via a second lead wire;

in the second electromagnetic touch electrodes of the second strip electrodes, except those used as the second three-dimensional driving electrodes, each two adjacent second electromagnetic touch electrodes are regarded as a group; wherein in each group, one terminal of a first one of the two adjacent second electromagnetic touch electrodes and one terminal of a second one of the two adjacent second electromagnetic touch electrodes are interconnected via a third lead wire, the other terminal of the first one of the two adjacent second electromagnetic touch electrodes is an electromagnetic signal detection terminal; and the other terminals of the respective second ones in respective groups are interconnected via a fourth lead wire;

in the first three-dimensional driving electrodes, each two adjacent first three-dimensional driving electrodes are regarded as a group; wherein in each group, one terminal of a first one of the two adjacent first three-dimensional driving electrodes and one terminal of a second one of the two adjacent first three-dimensional driving electrodes are interconnected via the first lead wire, the other terminal of the first one of the two adjacent first three-dimensional driving electrodes is an electromagnetic signal detection terminal; and the other terminals of the respective second ones in respective groups are interconnected via the second lead wire;

in the second three-dimensional driving electrodes, each two adjacent second three-dimensional driving electrodes are regarded as a group; wherein in each group, one terminal of a first one of the two adjacent second three-dimensional driving electrodes and one terminal of a second one of the two adjacent second three-dimensional driving electrodes are interconnected via the third lead wire, the other terminal of the first one of the two adjacent second three-dimensional driving electrodes is an electromagnetic signal detection terminal; and the other terminals of the respective second ones in respective groups are interconnected via the fourth lead wire.

6. The electromagnetic touch three-dimensional grating according to claim 5, further comprising a liquid crystal layer or an electrochromic material layer located between the upper substrate and the lower substrate; wherein during a three-dimensional displaying period, the first three-dimensional driving electrodes are applied with a same three-dimensional displaying signal, and the second strip electrodes are grounded, such that a region in the liquid crystal layer or in the electrochromic material layer corresponding to the first three-dimensional driving electrodes is formed as a light blocking region; or, the second three-dimensional driving electrodes are applied with a same three-dimensional displaying signal, and the first strip electrodes are grounded, such that a region in the liquid crystal layer or in the electrochromic material layer corresponding to the second three-dimensional driving electrodes is formed as a light blocking region.

7. The electromagnetic touch three-dimensional grating according to claim 4, further comprising a liquid crystal layer or an electrochromic material layer located between the upper substrate and the lower substrate; wherein during a three-dimensional displaying period, the first three-dimensional driving electrodes are applied with a same three-dimensional displaying signal, and the second strip electrodes are grounded, such that a region in the liquid crystal layer or in the electrochromic material layer corresponding to the first three-dimensional driving electrodes is formed as a light blocking region; or, the second three-dimensional driving electrodes are applied with a same three-dimensional displaying signal, and the first strip electrodes are grounded, such that a region in the liquid crystal layer or in the electrochromic material layer corresponding to the second three-dimensional driving electrodes is formed as a light blocking region.

8. The electromagnetic touch three-dimensional grating according to claim 1, further comprising a liquid crystal layer or an electrochromic material layer located between the upper substrate and the lower substrate;

wherein, during a three-dimensional displaying period, the first three-dimensional driving electrodes are applied with a same three-dimensional displaying signal, and the second strip electrodes are grounded, such that a region in the liquid crystal layer or in the electrochromic material layer corresponding to the first three-dimensional driving electrodes is formed as a light blocking region; or, the second three-dimensional driving electrodes are applied with a same three-dimensional displaying signals, and the first strip electrodes are grounded, such that a region in the liquid crystal layer or in the electrochromic material layer corresponding to the second three-dimensional driving electrodes is formed as a light blocking region.

9. The electromagnetic touch three-dimensional grating according to claim 8, wherein, during the three-dimensional displaying period, the first strip electrodes except the first three-dimensional driving electrodes are grounded; or the second strip electrodes except the second three-dimensional driving electrodes, are grounded.

10. A display device, comprising: a display panel and the electromagnetic touch three-dimensional grating according to claim 1 which is arranged on a light exiting side of the display panel.

11. The display device according to claim 10, wherein, the display panel is a liquid crystal display panel, an organic electroluminescent display panel, a plasma display panel or a cathode-ray tube monitor.

* * * * *